(12) United States Patent
Joehren et al.

(10) Patent No.: US 9,809,396 B2
(45) Date of Patent: Nov. 7, 2017

(54) METHOD AND CONTAINER CONVEYOR FOR REARRANGING A CONTAINER FLOW, AND DEVICE HAVING SAME

(71) Applicant: KHS GmbH, Dortmund (DE)

(72) Inventors: Thomas Joehren, Bocholt (DE); Thomas Nitsch, Kleve (DE)

(73) Assignee: KHS GmbH, Dortmund (DE)

( * ) Notice: Subject to any disclaimer, the term of this patent is extended or adjusted under 35 U.S.C. 154(b) by 0 days.

(21) Appl. No.: 15/021,392

(22) PCT Filed: Aug. 7, 2014

(86) PCT No.: PCT/EP2014/067029
§ 371 (c)(1),
(2) Date: Mar. 11, 2016

(87) PCT Pub. No.: WO2015/036185
PCT Pub. Date: Mar. 19, 2015

(65) Prior Publication Data
US 2016/0221765 A1    Aug. 4, 2016

(30) Foreign Application Priority Data

Sep. 13, 2013    (DE) .................. 10 2013 110 099

(51) Int. Cl.
| | |
|---|---|
| B65G 47/08 | (2006.01) |
| B65G 47/28 | (2006.01) |
| B65B 17/02 | (2006.01) |
| B65B 27/04 | (2006.01) |
| B65G 47/84 | (2006.01) |

(52) U.S. Cl.
CPC .............. B65G 47/28 (2013.01); B65B 17/02 (2013.01); B65B 27/04 (2013.01); B65G 47/088 (2013.01); B65G 47/841 (2013.01); B65G 47/846 (2013.01)

(58) Field of Classification Search
CPC ... B65G 47/088; B65G 47/841; B65G 47/846
USPC ... 198/418.7, 419.3, 459.2, 469.1, 575, 604, 198/605
See application file for complete search history.

(56) References Cited

U.S. PATENT DOCUMENTS

| | | | | |
|---|---|---|---|---|
| 1,667,991 A | * | 5/1928 | Russell .................. | B21D 43/14 198/459.2 |
| 1,941,152 A | * | 12/1933 | Noll ........................ | B65B 43/50 198/459.2 |
| 1,985,897 A | * | 1/1935 | Huntar .................. | B67C 7/0006 198/459.2 |

(Continued)

FOREIGN PATENT DOCUMENTS

| | | |
|---|---|---|
| DE | 641 035 | 1/1937 |
| DE | 29 13 446 | 10/1980 |

(Continued)

*Primary Examiner* — Douglas Hess
(74) *Attorney, Agent, or Firm* — Occhiuti & Rohlicek LLP (57) ABSTRACT

A method for separating containers in a densely packed container flow from each other so that they are spaced by a defined distance includes using a compartment star to place the containers on a rearrangement portion and then sweeping the containers forward using catch elements that move along the rearrangement portion so that they arrive at an inlet star with a separation that enables them to be picked up by a waiting inlet-star receptacle.

14 Claims, 8 Drawing Sheets

(56) References Cited

U.S. PATENT DOCUMENTS

| | | | | |
|---|---|---|---|---|
| 3,330,402 | A * | 7/1967 | Schlueter | B65B 35/46 |
| | | | | 101/35 |
| 4,216,854 | A * | 8/1980 | McCoy | B65G 47/846 |
| | | | | 188/69 |
| 5,695,041 | A * | 12/1997 | Kouda et al. | B65G 47/846 |
| | | | | 198/459.2 |
| 6,510,938 | B1 * | 1/2003 | Bowlin | B21D 51/2692 |
| | | | | 193/2 R |
| 6,561,341 | B1 * | 5/2003 | Kouda et al. | B65G 47/848 |
| | | | | 198/472.1 |
| 7,036,655 | B2 * | 5/2006 | Schafer | B65G 47/08 |
| | | | | 198/459.2 |
| 7,328,784 | B2 * | 2/2008 | Schinelli et al. | B65C 9/04 |
| | | | | 198/379 |
| 7,735,629 | B2 * | 6/2010 | Otruba | B65G 47/846 |
| | | | | 198/459.2 |
| 8,627,944 | B2 * | 1/2014 | Kelley et al. | B65G 33/06 |
| | | | | 198/459.3 |
| 9,061,838 | B2 * | 6/2015 | van de Loecht et al. | B65G 47/31 |
| 9,499,345 | B2 * | 11/2016 | Fenile | B65G 19/025 |

FOREIGN PATENT DOCUMENTS

| | | |
|---|---|---|
| DE | 30 45 505 | 7/1982 |
| DE | 87 11 599 | 10/1987 |
| DE | 42 36 784 | 5/1993 |
| DE | 195 00 624 | 7/1995 |
| DE | 60 2004 012 753 | 4/2009 |
| DE | 10 2012 100 810 | 6/2013 |
| WO | 2013/079852 | 6/2013 |

* cited by examiner

METHOD AND CONTAINER CONVEYOR FOR REARRANGING A CONTAINER FLOW, AND DEVICE HAVING SAME

RELATED APPLICATIONS

This is the national stage, under 35 USC 371, of PCT application PCT/EP2014/067029, filed on Aug. 7, 2014, which claims the benefit of the Sep. 13, 2013 priority date of German application DE 102013110099.6, the contents of which are herein incorporated by reference.

FIELD OF INVENTION

The invention relates to container processing, and in particular, to arranging containers in a container flow.

BACKGROUND

In the food and beverage industry, it is often necessary to transform a container flow made of densely packed containers into one in which the containers are uniformly spaced from each other. Typically, this transformation is carried out using a dividing screw.

A disadvantage of dividing screws arises from relative movement between the dividing screw and the containers. This can sometimes result in damage to containers, and in particular, to the labels. This is particularly troublesome when the containers are to be formed into bundles because the containers have already been filled and capped.

SUMMARY

The invention avoids the use of dividing screws and the disadvantages associated with them. Instead, rearranging of the container flow takes place with careful treatment of the containers and equipment by catch elements moving with the containers of the rearrangement unit provided on the rearrangement segment, and specifically without the containers or their equipping features incurring damaging shearing and relative movements, or corresponding forces occurring between elements of the rearranging segment and the containers.

The container conveyor according to the invention is particularly well-suited as a container inlet for devices for the handling of containers, for example with devices for disinfecting, cleaning, filling, and/or closing of containers. The container conveyor according to the invention is also well-suited as a container inlet for devices that produce bundles from a plurality of containers in each case, for example also with such devices that comprise, for example, at least two conveying segments to which the containers are directed in each case by means of a conveyor forming a container inlet, and are provided with applications of an adhesive, a conveying segment that follows the at least two conveying segments in a conveying direction of the containers to form an at least two-track container flow, and with means on the conveying segment, and specifically for separating the container groups from the container flow and for compacting the container groups, by combining the containers of each container group at the adhesive applications to form a bundle.

In a further embodiment of the invention, with the use of the container conveyor according to the invention as a container inlet of a device for forming bundles, this device is configured, for example, such that:

The means for separating and compacting the container groups are formed from press heads that secure the containers on their casing surfaces with at least one container receptacle in each case, move them in a conveying direction of the conveying segment, and press the containers against one another, which in each case are provided in pairs on sides of the conveying segment extending in the conveying direction, located opposite one another, In some embodiments, a plurality of press heads, for example two or three press heads, form in each case a press unit, moving along the conveying segment, and that the press units are provided in pairs, opposite each other on the conveying segment. This enables production of bundles with a plurality of containers, arranged in at least two rows and connected to one another by means of adhesive applications.

In other embodiments, the press heads can be moved on each side of the conveying segment on a closed movement or circulating track, of which one part length extends along the conveying segment,=. In these embodiments, the circulating track is preferably formed by a guide or guide rail for the press heads.

In other embodiments, a mechanical drive moves the press heads and/or the press units. An example of such a mechanical drive is one that has a chain and/or drive wheels or toothed wheels interacting with the press heads in the deflection areas of the circulating track, In other embodiments, the drive is an electrical linear drive that moves the press heads and/or press units. In these embodiments, the press heads are configured as moving elements or armatures of the electrical linear drive.

In other embodiments, the press heads comprise trolleys or carriages guided on a guide or guide rail, as well as a head piece forming a container receptacle. The head piece is movable in a controlled manner for a placement and executing a pressing movement at the trolley or carriage, preferably being guided such that it can be pushed.

In other embodiments, the head piece is provided at the trolley or carriage such that it can be exchanged, for example as a format part.

In yet other embodiments, the placement and press movement of the respective head piece takes place as a curve-controlled movement, and that, for this purpose, at least one guide piece is provided at the head piece, which engages in at least one fixed-position guide.

In yet other embodiments, formation of the press units with, in each case, a plurality of press heads mechanically connected to one another, one press head of each press unit, preferably the press head lagging behind in relation to the movement of the press unit, is configured such as to interact with the mechanical drive, for example with the chain that forms this drive, Embodiments also include any combination of the foregoing features.

In one aspect, the invention features a container processing method that includes, at a compartment star, receiving a first container flow of containers over a conveying segment, causing the compartment star to place containers one-by-one on a rearrangement portion between the compartment star and an inlet star to form a second container flow, moving the containers on the rearrangement portion with catch elements that move along the rearrangement portion toward the inlet star, loading containers on the rearrangement portion into inlet-star receptacles of an inlet star, and conveying the containers onward via the inlet star. The first container flow is a single-track container flow of upright containers. The second container flow is a single track container flow in which the containers are separated from each other by a constant separation selected such that, when a container arrives at the inlet star, an inlet-star receptacle is positioned to receive the container. The catch elements separate containers from each other by the separation distance before they arrive at the inlet star.

In some practices, moving the containers with catch elements comprises driving a pocket chain that carries the catch elements in an endless loop.

Other practices include those in which receiving a first container flow comprises receiving a densely packed container flow, those in which it comprises receiving containers in the first container flow at a speed that is greater than a speed at which the compartment star places containers on the rearrangement portion, and those in which it comprises receiving a container at a compartment-star receptacle that opens in a circumferentially outward direction, causing the compartment star to rotate about an axis parallel to an axis of the container by a circumferential distance equal to the constant separation, advancing the container by the constant separation, and releasing the container at the rearrangement portion, wherein the compartment star is disposed beside the conveying segment.

Other practices include moving the catch elements at a speed that is greater than or equal to a conveying speed of containers along the rearrangement portion.

In another aspect, the invention features a container conveyor for rearranging a single-track container flow conveyed via a conveying segment into a rearranged container flow that is then further conveyed via an inlet star, wherein, in the rearranged container flow, a gap between containers is selected to correspond to a spacing between inlet-star receptacles of the inlet star. Such an apparatus includes a compartment star disposed beside the conveying segment that is configured to convey containers to a rearrangement portion between the inlet star and the compartment star one after another and individually separated from each other, and a pocket chain at the rearrangement portion. The pocket chain carries catch elements that are separated by the gap and that project into the rearrangement portion so that they can convey containers to the inlet star.

In some embodiments, the compartment star rotates about an axis that is parallel to axes of the containers. The compartment star has, at a circumference thereof, a plurality of compartment-star container-receptacles, each of which is open on a circumference side of the compartment star. Each compartment-star container-receptacle accommodates a container. The compartment star is disposed beside the conveying segment. When the compartment star rotates by an amount equal to one gap measured at the circumference, a first compartment-star container receptacle picks up a container from the conveying segment and a second compartment-star container receptacle discharges a container on the rearrangement portion.

In some embodiments, the pocket chain is arranged to extend beside the rearrangement portion in such a way that the catch elements extend into the rearrangement portion.

In other embodiments, the chain drive that circulates in an endless loop is arranged in a plane that is perpendicular to axes of the containers.

In yet other embodiments, the endless loop extends along the rearrangement portion.

Also among the embodiments are those in which the compartment star comprises pairs of compartment-star container-receptacles separated by a pointed compartment-star projection.

Additional embodiments include a container inlet formed from the container conveyor. Among these are those in which a container-processing machine lies upstream of the container conveyor. Also among these embodiments are those that have a bundling machine downstream from the inlet star for producing container bundles from container groups. These container bundles have at least two rows. The bundling machine comprises has a pair of handling segments to which containers are conveyed via the container conveyor. It also has an adhesive applicator for applying an adhesive spot to a container. A conveying segment following the handling segments carries a multi-track container flow in a conveying direction. Pressing heads disposed along the conveying segment separate container groups out of the container flow and compact the container groups by connecting the containers of each container group at the adhesive spots to form a bundle.

Further embodiments, advantages, and possible applications of the invention are also derived from the following description of exemplary embodiments and from the Figures. In this situation, all the features described and/or represented as images are in principle the object of the invention, individually or in any desired combination, regardless of their relationship in the claims or references to them. The content of the claims is also made a constituent part of the description.

As used herein, expressions such as "essentially" or "about" or "approximately" refer to deviations from an exact value by ±10%, preferably by ±5%, and/or deviations that are not significant for function.

As used herein, "equipping features" refers to elements that are applied onto the containers as information and/or publicity elements or instructions, and/or are applied for the purpose of providing proof of a guarantee and/or of originality and/or for producing a visual container appearance image being striven for. Equipping elements include, without limitation, labels, banderols, film wrappings, and print images applied to the containers.

As used herein, "containers" includes cans and bottles, whether made of metal, glass, and/or plastic, as well as packing means such as those that are suitable for the filling of powdered or granulated products as well as viscous fluids.

As used herein, a "densely packed container flow" or "compact container flow" is a container flow in which the containers are located against one another or in which containers follow one another closely.

The invention is explained in greater detail hereinafter on the basis of the figures relating to an exemplary embodiment, and specifically together with a machine or device for the handling of containers, configured, for example, as a device for producing bundles from a plurality of containers in the form of bottles. The figures show:

DETAILED DESCRIPTION

Figure 4:
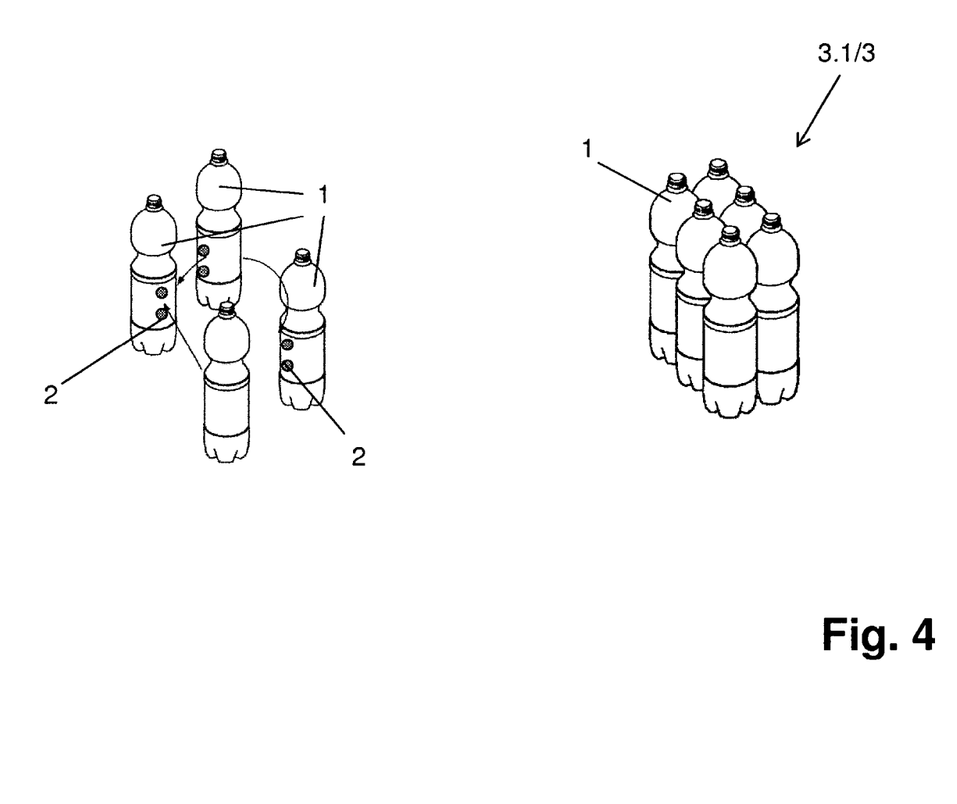
FIG. 4 shows steps in using contact adhesive to join containers into a bundle.

FIG. 4 shows filled and closed containers 1 that are to be joined to form a container bundle 3.1 using adhesive spots 2. The containers shown are bottles, and in particular, bottles formed from plastic or from PET (polyethylene terephthalate) by blow molding.

In the illustrated embodiment, six containers 1 form a compacted container group 3.1 having two rows of three containers 1 each that are connected to each other by adhesive spots 2 of contact adhesive. The resulting bundle 3 therefore requires no outer packing. The adhesive spots 2 are applied onto the areas touching one another of the casing surfaces of the containers 1 in the compacted container group 3.1.

Figure 3:
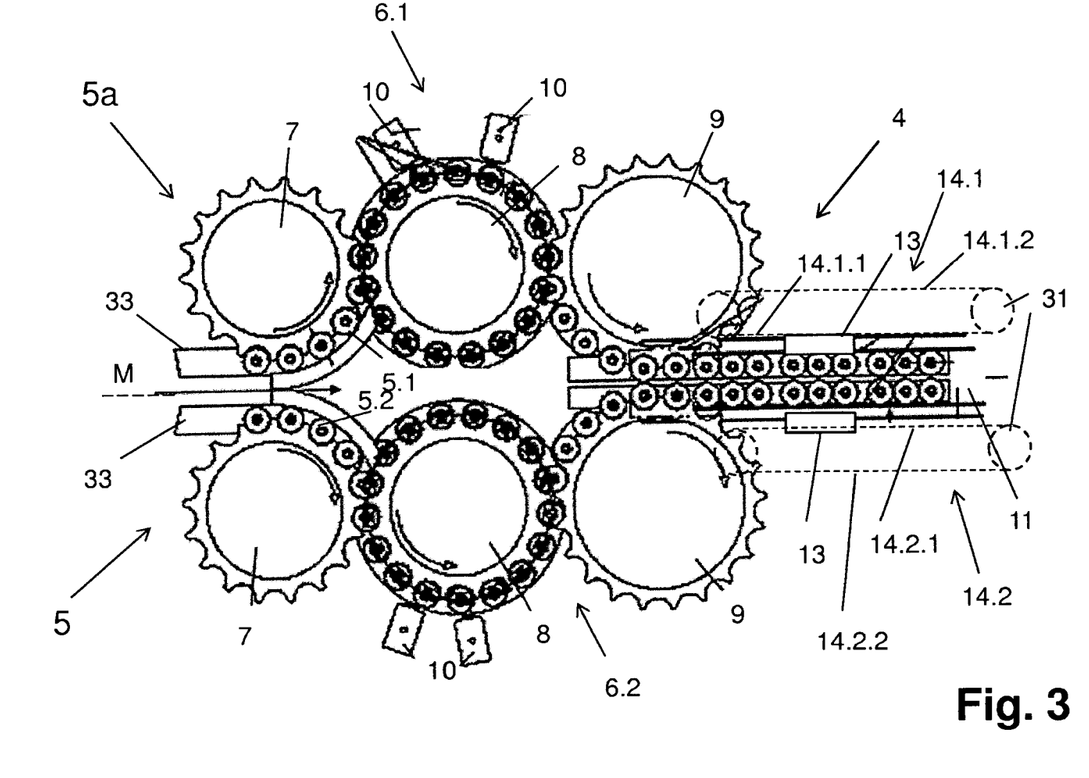
FIG. 3 shows a top view of a device for producing bundles, with two container inlets formed in each case by a container conveyor from FIGS. 1 and 2.

FIG. 3 shows a bundling machine 4 that joins containers 1 together to form a bundle 3. The bundling machine 4 has first and second container conveyors 5, 5a that each carry corresponding first and second single-track container flows 5.1, 5.2 of upright containers 1 that have their container axes oriented vertically. Within the single-track compacted container flows 5.1, 5.2, containers 1 follow one another closely in the conveying direction A with the containers being separated as required by first and second handling segments 6.1, 6.2 towards which they are being conveyed by the first and second container conveyors 5, 5a.

In the embodiment shown, the first and second handling segments 6.1, 6.2 are mirror images of each other about a vertical mid-plane M. Each handling segment 6.1, 6.2 has an inlet star 7, a handling star 8, and an outlet star 9, all of which rotate about corresponding vertical axes, and all of which have container receptacles along their respective circumferences.

The handling star 8 carries containers past a stationary application head 10. The application head 10 applies an adhesive spot 2 to a container's surface. If more than one adhesive spot is required, additional application heads 10 can be provided. To enable it to present the correct portion of a container to the application head 10, the handling star's container receptacles rotate or pivot a container about its vertical container axis.

After the adhesive spot 2 has been applied, the handling star 8 passes the container 2 to the outlet star 9, which then places the container 1 on a conveying segment 11. The conveying segment 11 receives containers from outlet stars 9 of both the first and second container conveyors 5, 5a. Accordingly, the conveying segment 11 has two container tracks. The conveying segment 11 then conveys these container tracks in a second conveying direction B, which in the embodiment shown is the same direction as the first conveying direction A.

Each track forms a row of a container group 3.1. The two rows of the container group 3.1 thus extend along the second conveying direction B. The container groups 3.1 are spaced at a distance from each other along the second conveying direction B.

Each container group 3.1 is compacted on the conveying segment 11 as it is conveyed. During this compaction, containers 1 of each container group 3.1 are pressed against each other in both a pressing direction C, shown in FIG. 8, and along the second conveying direction B. As a result of this compaction, the adhesive spots 2 bind the containers 1 to each other to form a bundle 3.

Figure 5:
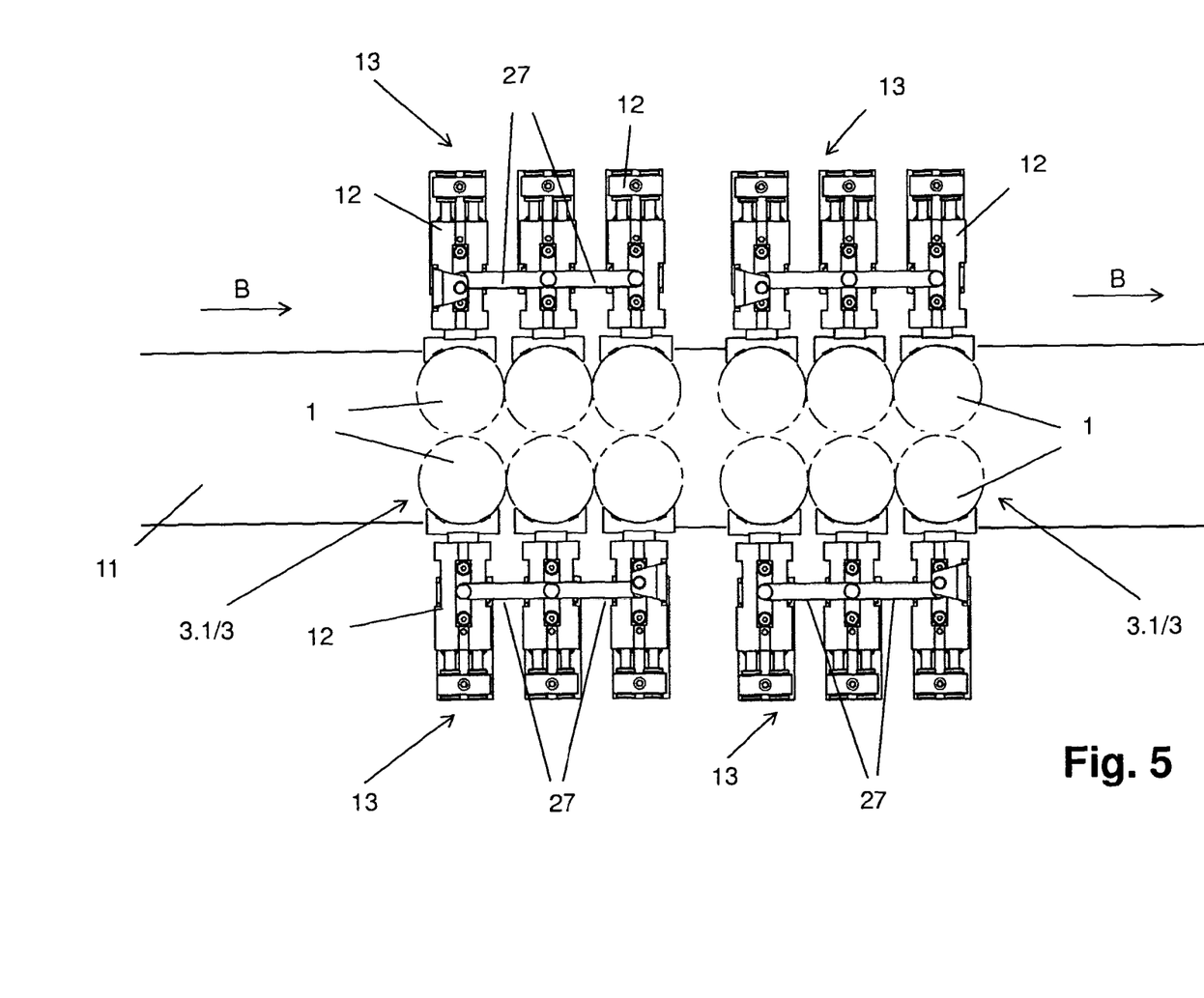
FIG. 5 is a top view of press heads from the device shown in FIG. 3 as they move along a conveying segment with the containers.

Press heads 12, shown in FIG. 5, form container groups 3.1, compact the containers in the group, and ultimately, produce bundles 3. In the illustrated embodiment, three press heads 12 combine to form a press unit 13. The three press heads 12 correspond to the three columns in the bundle 3. There are two press units 13 on opposite sides of the conveying segment 11. These move together on first and second loops 14.1, 14.2 as shown in FIG. 3.

During operation, two press units 13 on both sides of the conveying segment 11 move along first and second loops 14.1, 14.2 that run along either side of the conveying segment 11. Each loop 14.1, 14.2 has an inner run 14.1.1, 14.2.1 and an outer run 14.1.2, 14.2.2, both of which extend along the second conveying direction B on different sides of the conveying segment 11. In operation, two press units 13 move opposite each other in synchrony on two inner runs 14.1.1, 14.2.1.

Figure 8:
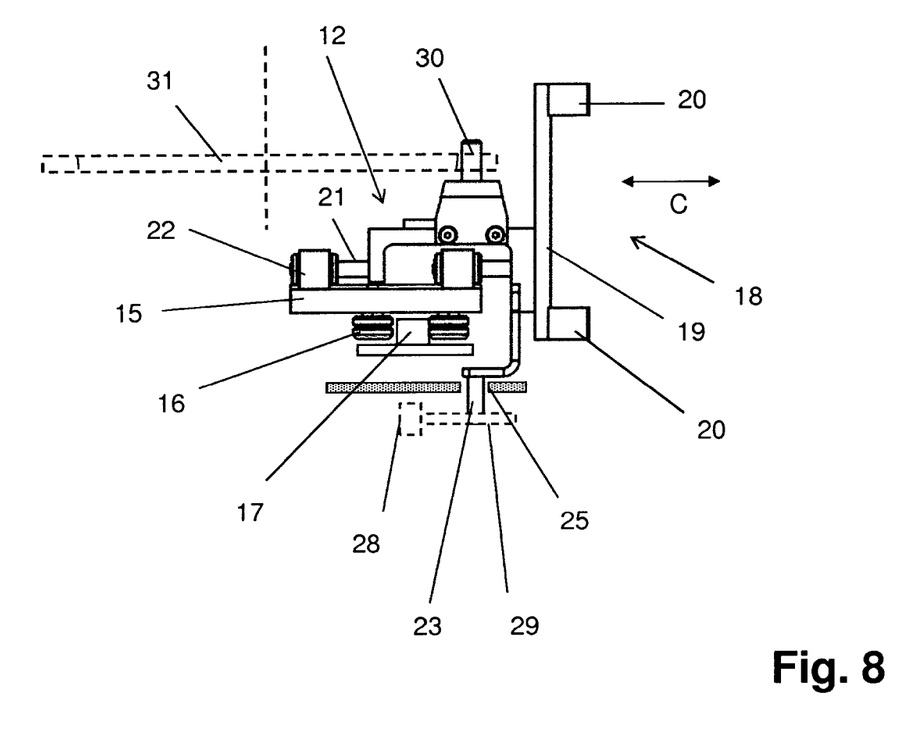

Referring to FIG. 8, a press head 12 includes a trolley or carriage 15 having guide rollers 16 on an underside thereof. The guide rollers guide the carriage 15 along a guide rail 17 that follows either the first or second loop 14.1, 14.2.

An upper side of the carriage 15 includes a head piece 19, that can be horizontally displaced in a controlled manner along a direction that is essentially perpendicular to the second conveying direction B along a pressing direction C. The head piece 19 projects over the side of the press head 12 and of the carriage 15 and faces the conveying segment 11. In the illustrated embodiment, the head piece 19 has two head-piece receptacles 20 that are adjusted to the diameter of the containers 1. These head-piece receptacles 20 are vertically offset to accommodate upper and lower portions of a container 1 along part of the container's circumference.

To carry out its pressing movement along the pressing direction C, the strip-like head piece 19 relies on a pair of parallel guide rods 21, each of which is secured at one end and each of which passes through a corresponding guide sleeve 22 on a rear side of the headpiece and facing away from the head-piece receptacle 20.

The head piece 19, the head piece receptacles 20, and the guide rods 21 combine to form a format part 18 that can be easily swapped in or out and changed to accommodate different sizes of containers 1.

Figure 7:
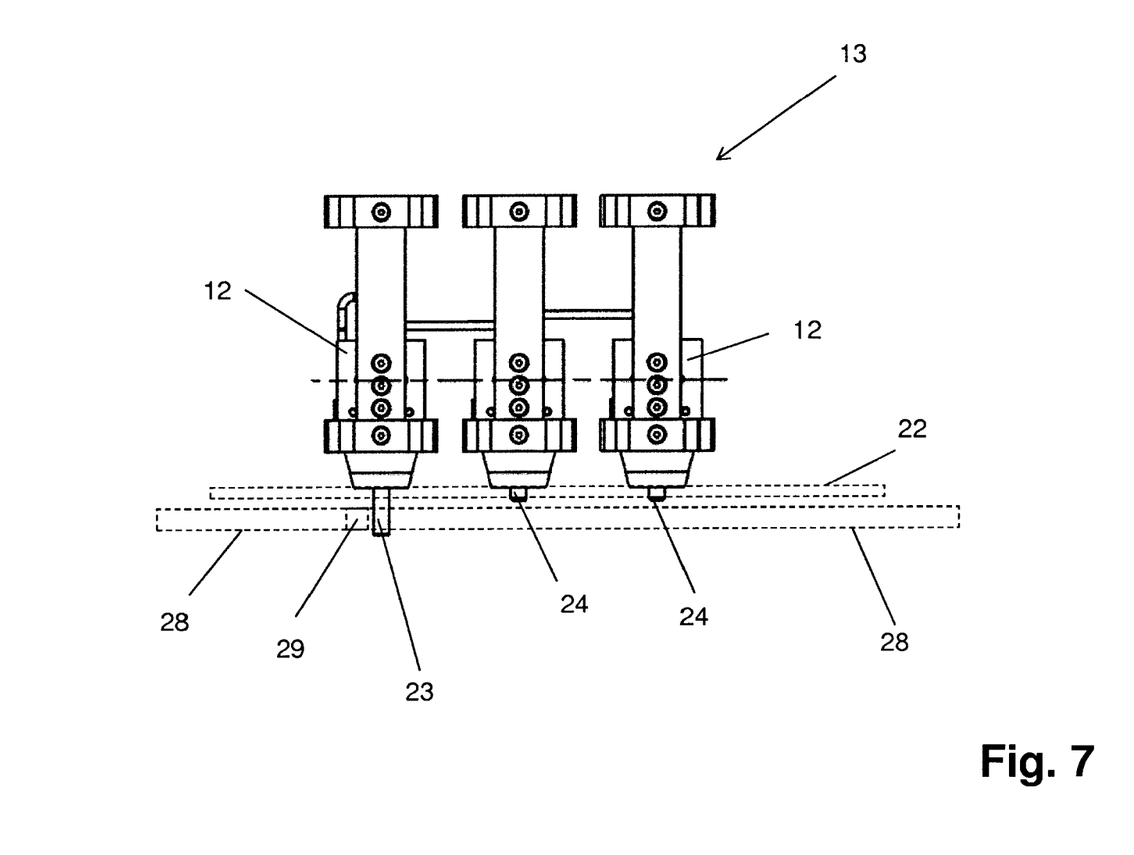

In connection with carrying out the press movement, each head piece 12 has a long guide pin 23 and a short guide pin 24, both of which project downward. The long guide pin 23 and the short guide pin 24 can be seen in FIG. 8. Only the short guide pin 24 can be seen in FIG. 7.

Referring to FIG. 8, as the press head 12 moves along the inner run 14.1.1, 14.2.1, the long guide pin 23 engages a guide curve 25. The course of the guide curve 25 controls the movement of the head piece 19 along the direction of pressing direction C. The guide rail 25 follows a route such that before the containers 1 are transferred from the outlet star 9 to the conveying segment 11, the guide rail 25 causes the head piece 19 to be outside the path of the conveying segment 11. As the press head 12 moves further down the inner run 14.1.1, 14.2.1, the guide curve 25 causes the head pieces 19 of the press heads 12 to move in the pressing direction C. Eventually, the containers that are to belong to a bundle 3 are engaged by head pieces 19 from opposing press units 13.

In the case of containers 1 that are elastically deformable, such as plastic containers, pressing the containers 1 along the pressing direction C causes a small deformation along the second conveying direction B. This causes adhesive spots 2 facing the second conveying direction B to adhesively bind containers 1 together in a bundle 3. Meanwhile, the force along the pressing direction C causes adhesive spots 2 that face the pressing direction C to adhesively bind containers 1 to each other.

In some embodiments, the guide sleeves 22 on at least the two outer press heads 12 of each press unit 13 are oriented to move the press heads 12 along a path having a component in the pressing direction C and also a component in the second conveying direction B. This provides a force that causes adhesive spots 2 facing the second conveying direction B to adhesively bind containers 1 without having to rely on the containers' elasticity.

As the press unit 13 continues to move along the conveying segment 11, the guide curve 25 turns so that it causes the head pieces 19 to move outward, thus releasing the containers 1.

When the press heads 12 of a press unit 13 engage the containers that are to be in a bundle 3, the press unit moves slightly faster than the rate at which the outlet stars 9 are feeding containers 1 to the conveying segment 11. This allows a gap to form between groups of containers 1, thus facilitating formation of the container groups 3.1.

When a press head 12 presses against a container 1, there is a chance that the container 1 will rotate slightly. This is undesirable because it is more aesthetically pleasing for all container labels to face outward. Therefore, to avoid this undesirable rotation of the containers 1, some embodiments have a friction coating 26 on the head piece receptacles 20. The increased friction between the container 1 and the head-piece receptacle 20 from this friction coating 26 reduces the likelihood of rotation.

Figure 6:
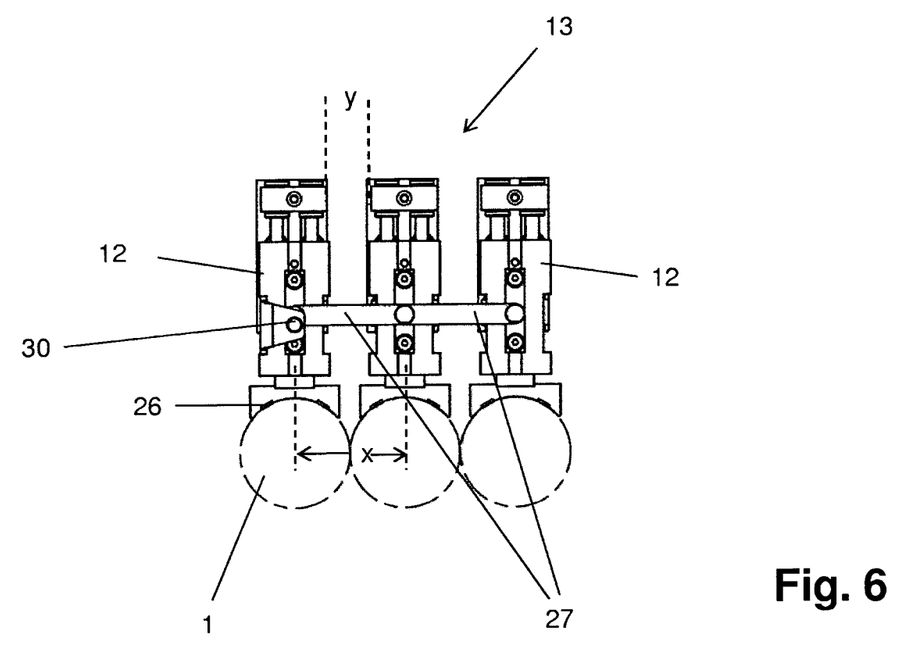
FIGS. 6-8 show different views of three press heads as shown in FIG. 5.

Referring now to FIG. 6, a pair of link plates 27 on the upper side of the press heads 12 provides a jointed mechanical linkage to form the press unit 13. The link plates 27 are arranged such that an axial spacing x between the head piece 20 of the press heads 12 corresponds to the diameter of a container 1. In addition, a separation distance y separates adjacent press heads 12 to ensure that the press units 13 will be able to easily go around the deflection areas of the loop 14.1, 14.2 along which it travels.

A press unit 13 moves along an inner run 14.1.1, 14.2.1 and an outer run 14.1.2, 14.2.2. The outer run 14.1.2, 14.2.2 guides the press unit 13 back to the transfer area between the outlet star 9 and the conveying segment 11.

In some embodiments, a rotating chain 28 drives the press units 13. Such a chain 28 includes feed links 29 spaced at a distance that corresponds to the distance between the press units 13. The long pin 23 projects downwards past the guide curve 25 to engage a feed link 29. This causes the press unit 13 to move with the chain 28 in the second conveying direction B.

Referring now to FIG. 8, the press head 12 includes an upwardly protruding upper guide pin 30. This upper guide pin 30 comes into play when the press head 12 is at a deflection point of a loop 14.1, 14.2. As the press head 12 approaches a deflection region, the upper guide pin 30 engages a rotating toothed wheel 31 and the long pin 23 disengages from its feed link 29. This lets the press unit 13 move freely through the deflection region.

There are other ways to compact a container group 3.1 along the second conveying direction B. One way is to replace the link plates 27 with hydraulic or pneumatic cylinders that can be actuated to press the containers together along the second conveying direction B, thus reducing the distance y between press heads 12. It is also possible to provide a kinematic arrangement that couples movement of the head piece 19 in the pressing direction C with exertion of compressive force along the second conveying direction, which in turn also reduces the distance y between press heads 12. Another way to press containers against each other in the second conveying direction B is to have the axial spacing x between the head-piece receptacles 20 be smaller than the diameter of the container 1.

In some embodiments, an electric linear motor replaces the mechanical drive of the press units 13, with its two chains 28 and its toothed wheels 31. In these embodiments, each press head 12 has a drive winding or a permanent magnet. Meanwhile, the loops 14.1, 14.2 have magnetic poles with changing polarity, which can be implemented by magnetic windings.

In these embodiments, the press heads 12 act as individually controllable armatures of an electric motor. Because the press heads 12 are individually controllable, one can achieve the same performance with fewer press heads 12. This is because the press heads 12 traveling along the outer runs 14.2.1, 14.2.2 can be moved faster than the press heads 12 traveling along the inner runs 14.1.1, 14.1.2.

An additional advantage of driving the press heads 12 with an electric linear motor is that it is no longer necessary to physically group them together into press units 13. Since the press heads 12 are individually controllable, it becomes possible to dynamically form press units 13 by simply causing a number of press heads 12 to all travel together at the same speed and at close proximity with each other. This makes it much easier for the bundling machine 4 to be reconfigured to form different kinds of bundles 3.

Yet another advantage of driving the press heads 12 with an electric linear motor is that it makes it easier to apply a compressive force along the second conveying direction B. One only has to decelerate the leading press head 12 while accelerating the trailing press head 12.

Figure 1:
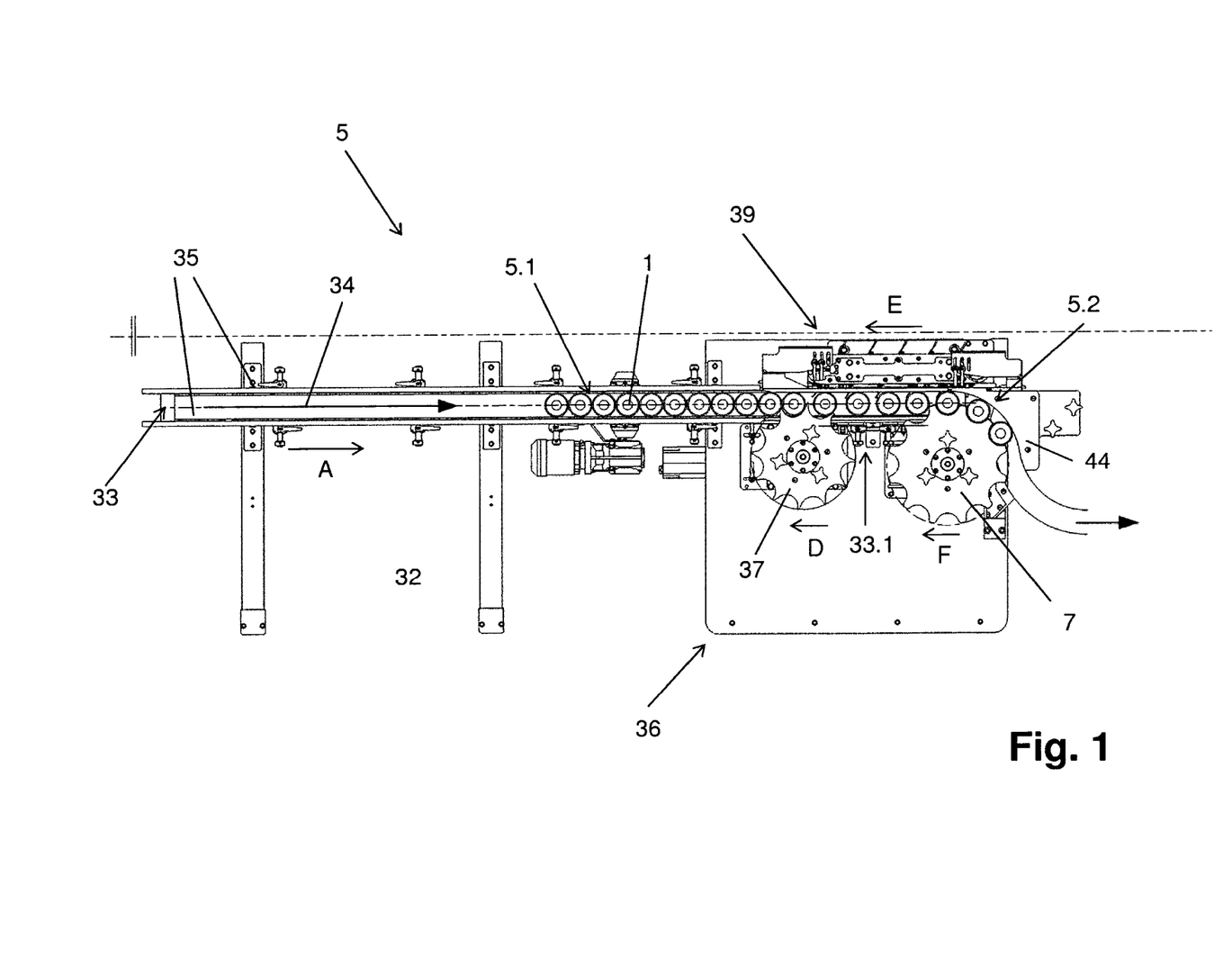
FIG. 1 is a top view of a container conveyor.
Figure 2:
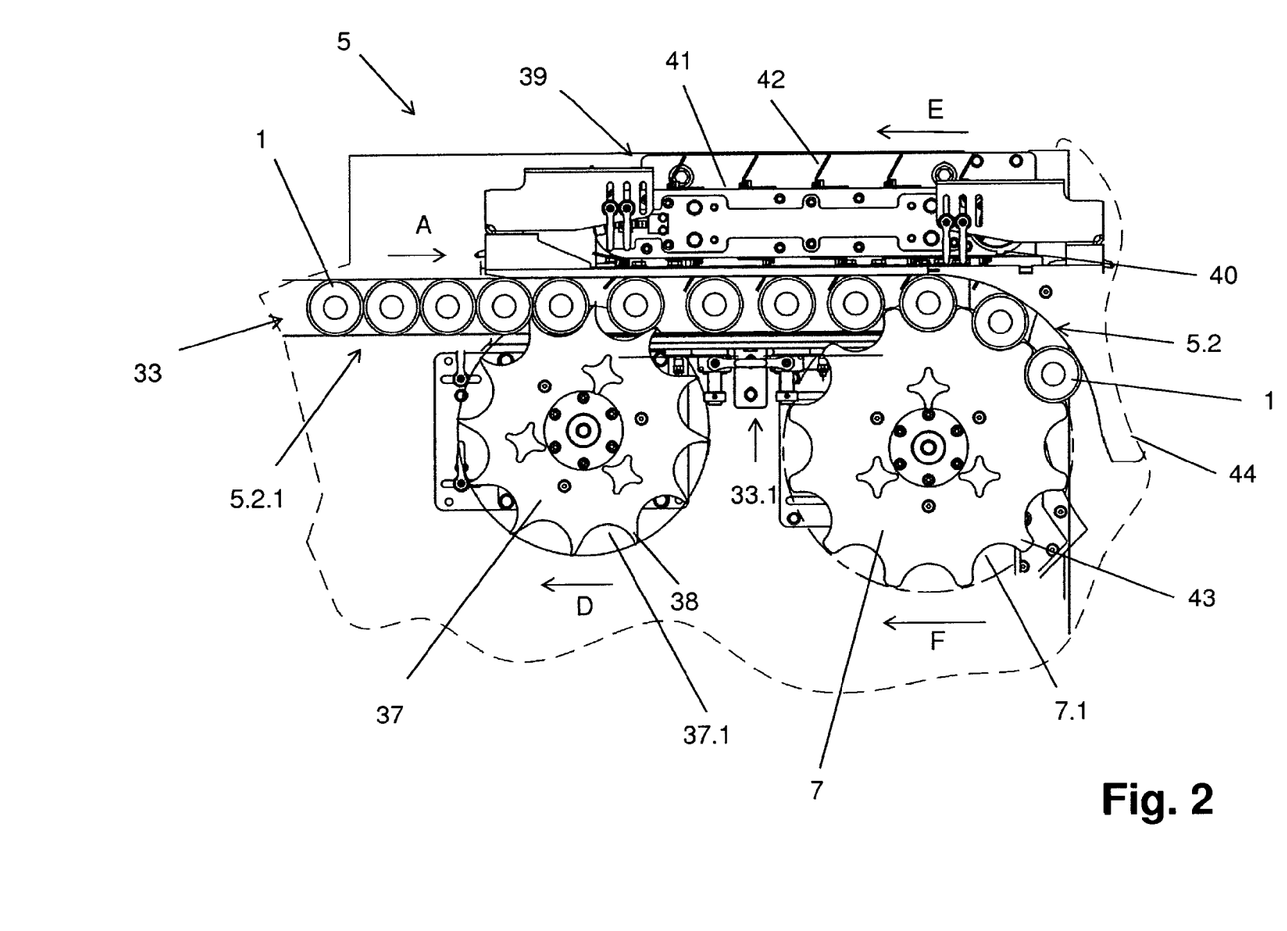
FIG. 2 is a close up of a portion of the conveyor shown in FIG. 1.

FIGS. 1 and 2 show details of the first conveyor 5, which provides containers to the second handling segment 6.2 in FIG. 3. The second conveyor 5a, which provides containers to the first handling segment 6.1, works in the same way.

Referring now to FIGS. 1 and 2, the first container conveyor 5 includes a conveyor element 32 that conveys a single track of densely packed upright containers 1 along the first conveying direction A. The conveying element 32 includes a straight conveying segment 33 that has an endless conveyor band 34 forming a closed loop, and optional lateral guide rails 35. The conveyor band 34 forms a horizontal surface on which containers 1 stand on their bases. Preferably, the conveyor band 34 extends all the way to the inlet star 7.

A flow-transformer 36 along the conveying segment 33 receives a first container flow 5.1 and rearranges it to form a second container flow 5.2. The first container flow 5.1 is densely packed, whereas in the second container flow 5.2, containers are spaced apart by a constant spacing that corresponds to the distances between container pockets or container inlet-star receptacles 7.1 along the circumference side of the inlet star 7 and distances required for transfer to the bundling machine 4 or to the respective handling star 8.

Referring now to FIG. 2, the flow-transformer 36 includes a compartment star 37 having compartment-star container-receptacles 37.1 along a circumference thereof. In the compartment star 37, the projections that separate two compartment-star container-receptacles 37.1 come to a pointed compartment-star projection 38.

The compartment star 37 is driven such as to rotate about its vertical axis in a compartment star direction D and arranged in such a way that it extends with a part of its circumference into the conveying segment 33. The compartment star 37 is therefore able to capture a container on the conveying segment 33, move it forward along the conveying segment 33, and drop it off at rearrangement portion 33.1 of the same conveying segment 33.

During this operation, the compartment-star projection 38 that is behind a particular container 1 holds the next container 1 back. This has the effect of increasing the spacing between containers 1 downstream from the compartment star 37. Thus, after having been picked up and put down by the compartment star 37, the containers are spaced apart by a spacing that depends on the separation between the compartment-star container-receptacles 37.1 on the compartment star 37.

In order to attain the packed container flow before the compartment star 37, the conveying speed of the conveyor band 34 is equal to or somewhat greater than the circumferential speed of the compartment star 37, i.e. somewhat greater that the conveying speed with which the respective container 1, taken up in a compartment-star container-receptacle 37.1, is moved onwards into the rearrangement portion 33.1.

A pocket chain 39 lies adjacent to the rearrangement portion 33.1 on a side opposite that occupied by the compartment star 37. The pocket chain 39 serves as a rearranging unit for producing or determining, segment by segment, the precise separation distance between the containers 1 on the segment between the compartment star 37 and the inlet star 7.

The pocket chain 30 includes a chain element 41 and deflection wheels or chain wheels 40 to drive the chain element 41. The chain element 41 forms a closed horizontal loop, the outside of which carries pocket elements, or catch elements 42 that project from the chain element 41. The catch elements 42 are spaced from one another along a pocket chain direction E of the pocket chain 39.

The pocket chain 39 is arranged and driven in such a way that the catch elements 42 moving in the first conveying direction A extend into the rearrangement portion 33.1. A catch element 42 catches a container 1 that has just passed through the compartment star 37 and conveys it in the first conveying direction A toward the inlet star 7. As an alternative, a pocket chain 39 could also circulate vertically instead of horizontally. This type of pocket chain 39 would use pivot thrust rods or pocket elements between containers 1 that have been spaced by the compartment star 37.

The space between a pair of catch elements 42 corresponds to the distance between the inlet-star receptacles 7.1 of the inlet star 7. As a result, the pocket chain 39 brings containers 1 to the inlet star 7 at the correct spacing for insertion into its inlet-star receptacles 7.1. The inlet star 7 rotates in an inlet star direction F at a speed that is synchronized with that of both the pocket chain 39 and the compartment star 37. As a result, the circumferential speed of the inlet star 7 is equal, or essentially equal, to the speed at which the catch elements 42 move along the rearrangement portion 33.1.

As FIG. 2 shows, the inlet star 7 has inlet-star projections 43 between its inlet-star receptacles 7.1. These inlet-star projections 43 are much wider than the pointed and claw-shaped compartment-star projections 38. Instead of coming to a point, the inlet-star projections 43 have a substantially greater width in the circumferential direction. Although they taper towards their ends, they do not form a point like the compartment-star projections 38. Instead, they are blunt or rounded.

An arcuate guide 44 surrounds a portion of the inlet star's circumference. This actuate guide 44 helps ensure that the inlet-star receptacles 7.1 properly take up the containers 1.

A particular advantage of the container conveyor 5 is that the rearrangement of the closely compacted container flow 5.1 into the less densely packed container flow 5.2 takes place by way of the pocket chain 39, which extends over the entire length of the rearrangement portion 33.1, in a manner that safeguards the containers 1 and their equipping elements, in particular labels or imprints, and without shear movements, relative movements, or corresponding forces being exerted between the containers and the function elements of the container conveyor 5, and, in particular between the containers 1 and the catch elements 42.

In an alternative embodiment, the catch elements 42 are sickle-shaped, such that a horizontally linear or flat touch contact of the containers is established. This tends to avoid any further rotation or relative movement of the containers.

The arrangement is ideally such that the opposing rails or any side rails can be done away with on the rearrangement portion 33.1 between the compartment star 37 and the inlet star 7.

It has been assumed heretofore that the container conveyors 5, 5a respectively form the container inlet of the bundling machine 4 for producing bundles. It is understood that the container conveyor 5, 5a can advantageously also be used with other devices for the handling of containers, preferably as a container inlet, for example with devices for cleaning and/or sterilizing of containers 1, filling machines, closing machines, devices for the equipping of containers 1, such as, for example, labeling machines, machines or devices for the printing of containers, etc.

In a preferred embodiment, the flow-transformer 36 forms a fully functional structural unit that is modular and that can thus be easily replaced in the event of a fault.

Having described the invention, and a preferred embodiment thereof, what we claim as new, and secured by Letters Patent is:

1. A method of processing containers, said method comprising, at a compartment star, receiving a first container-flow of containers over a conveying segment, causing said compartment star to place containers one-by-one on a rearrangement portion between said compartment star and an inlet star to form a second container-flow, driving a pocket chain that carries catch elements in an endless loop, wherein, as a result of being driven by said pocket chain toward said inlet star, said catch elements rearrange said containers along said rearrangement portion, loading containers on said rearrangement portion into inlet-star receptacles of an inlet star, and conveying said containers onward via said inlet star, wherein said first container-flow is a single-track container-flow that comprises containers standing upright, wherein said second container-flow is a single track container-flow in which said containers are separated from each other by a constant separation, wherein said constant separation is selected such that, when a container arrives at said inlet star, an inlet-star receptacle is positioned to receive said container, and wherein said catch elements are configured to cause said containers to be separated from each other by said separation distance prior to arrival of said containers at said inlet star.

2. The method of claim 1, wherein receiving a first container-flow comprises receiving a densely-packed container-flow.

3. The method of claim 1, wherein receiving a first container-flow comprises receiving containers in said first container-flow at a speed that is greater than a speed at which said compartment star places containers on said rearrangement portion.

4. The method of claim 1, wherein receiving a first container-flow comprises receiving a container at a compartment-star receptacle that opens in a circumferentially outward direction, causing said compartment star to rotate about an axis parallel to an axis of said container by a circumferential distance equal to said constant separation, advancing said container by said constant separation, and releasing said container at said rearrangement portion, wherein said compartment star is disposed beside said conveying segment.

5. The method of claim 1, further comprising moving said catch elements at a speed that is the greater than or equal to a conveying speed of containers along said rearrangement portion.

6. An apparatus comprising a container conveyor for rearranging a single-track container-flow conveyed via a conveying segment into a rearranged container-flow that is then further conveyed via an inlet star, wherein, in said rearranged container-flow, a gap between containers is selected to correspond to a spacing between inlet-star receptacles of said inlet star, said apparatus comprising a compartment star, a rearrangement portion, a pocket chain, and catch elements, wherein said compartment star is disposed beside said conveying segment, wherein said compartment star is configured to convey containers to said rearrangement portion one after another and individually separated from each other, wherein said rearrangement portion is between said inlet star and said compartment star, wherein said pocket chain is at said rearrangement portion, wherein said pocket chain comprises a chain drive that circulates in an endless loop, wherein said pocket chain carries said catch elements, wherein said catch elements are separated by said gap, wherein said catch elements project into said rearrangement portion, and wherein said catch elements are configured to convey containers to said inlet star.

7. The apparatus of claim 6, wherein said compartment star rotates about an axis that is parallel to axes of said containers, wherein said compartment star comprises, at a circumference thereof, a plurality of compartment-star container-receptacles, each of which is open on a circumference side of said compartment star, wherein each compartment-star container-receptacle accommodates a container, wherein said compartment star is disposed beside said conveying segment, wherein, when said compartment star rotates by an amount equal to one gap measured at said circumference, a first compartment-star container receptacle picks up a container from said conveying segment and a second compartment-star container receptacle discharges a container on said rearrangement portion.

8. The apparatus of claim 6, wherein said pocket chain is arranged to extend beside said rearrangement portion in such a way that said catch elements extend into said rearrangement portion.

9. The apparatus of claim 6, wherein said chain drive that circulates in an endless loop is arranged in a plane that is perpendicular to axes of said containers.

10. The apparatus of claim 6, wherein said endless loop extends along said rearrangement portion.

11. The apparatus of claim 6, wherein said compartment star comprises pairs of compartment-star container-receptacles separated by a pointed compartment-star projection.

12. The apparatus of claim 6, further comprising a container inlet formed from said container conveyor.

13. The apparatus of claim 12, further comprising a container-processing machine upstream of said container conveyor.

14. The apparatus of claim 12, further comprising a bundling machine downstream from said inlet star for producing container bundles from container groups, said container bundles comprising at least two rows, wherein said bundling machine comprises first and second handling segments to which containers are conveyed via said container conveyor, wherein said bundling machine comprises an adhesive applicator for applying an adhesive spot to a container, and a conveying segment following said first and second handling segments for carrying an at least two-track container-flow in a conveying direction, and pressing heads disposed along said conveying segment for separating container groups out of said container flow and for compacting said container groups by connecting said containers of each container group at said adhesive spots to form a bundle.

* * * * *